United States Patent Office 3,606,493
Patented Sept. 20, 1971

3,606,493
ANTI-SKID BRAKE SYSTEM
Erwin Schlitz, Heusenstamm, and Werner Fink, Frankfurt am Main, Germany, assignors to International Telephone and Telegraph Corporation, New York, N.Y.
Filed July 25, 1969, Ser. No. 845,013
Claims priority, application Germany, Aug. 2, 1968, P 17 80 121.7
Int. Cl. B60t 8/08
U.S. Cl. 303—21CF                          3 Claims

ABSTRACT OF THE DISCLOSURE

A speed dependent anti-skid brake control system for vehicles having hydraulic brakes, including a voltage generator for producing a voltage signal proportional to wheel speed and a series of controls responsive to different voltage signal levels for controlling brake pressure. The controls are successively operated, either in response to a timer or reduced brake pressure, to provide stepped regulation at a series of decreasing speed levels.

BACKGROUND OF THE INVENTION

Field of the invention

This invention relates to anti-skid brake systems for motor vehicles.

Description of the prior art

Various systems have been proposed for controlling the pressure in hydraulic brake systems to prevent or minimize locking of the wheels upon application of the brakes.

Several of the known systems use a critical deceleration of a wheel as the actuating parameter of the system. This requires either an expensive and complicated mechanism arrangement for sensing deceleration or a multistep electronic handling of a measured parameter, such as wheel speed, which may be differentiated to provide a deceleration signal.

Similar systems which respond only after the wheel has already become locked are also known. However, the fact that these systems respond only after the undesirable condition has been reached limits their value.

United States Pat. No. 1,661,625 discloses an electric brake system having a circuit which is interrupted by a relay when the wheel speed goes below a predetermined value. The circuit is not closed again until the rotational speed of the wheel corresponds to the translational speed of the vehicle. The fact that the wheel is allowed to reach the full instantaneous speed of the vehicle during each cycle of regulation is a distinct disadvantage since a certain amount of slipping is desirable for maximum braking.

The conventional anti-skid control systems described above are disproportionately expensive, complicated in construction and susceptible to malfunction and therefore until recently these devices have only been used in airplanes and rail vehicles.

SUMMARY OF THE INVENTION

It is an object of this invention to eliminate the above-mentioned disadvantages in known systems and provide an anti-skid brake control system which does not unnecessarily increase stopping distance.

It is a further object of this invention to provide an anti-skid brake control system which operates before the wheels become locked and which does not allow the wheel speed to reach the instantaneous vehicle speed when the regulator is in operation.

The present invention achieves these objects by providing stepped regulation at a series of decreasing speed levels. Similarly constructed control units operate at different levels of a controlled variable, such as a voltage signal which is proportional to the rotational speed of the wheels. The output signal of the control units controls an electromagnetic valve which regulates the brake pressure in one or more of the hydraulic brake lines leading to the wheels.

An electronic switch or trigger as a function of the initial speed upon application of the brakes determines the control unit which is initially operated. Thereafter, stepping from one speed barrier to the next takes place either by means of a timing element or as a function of brake pressure at the wheels.

In order to provide uniform braking on all the wheels and a smooth transition between regulating stages, the stepping switches for going from one speed barrier to another may be all interconnected so that the speed levels for all the wheels will change simultaneously. Rather than providing individual switches for each wheel a single switch may be provided on one wheel, preferably of the back axle, so that the operation of a single switch will automatically switch the whole system to the next regulating stage.

DESCRIPTION OF THE PREFERRED EMBODIMENTS

Figure 1:
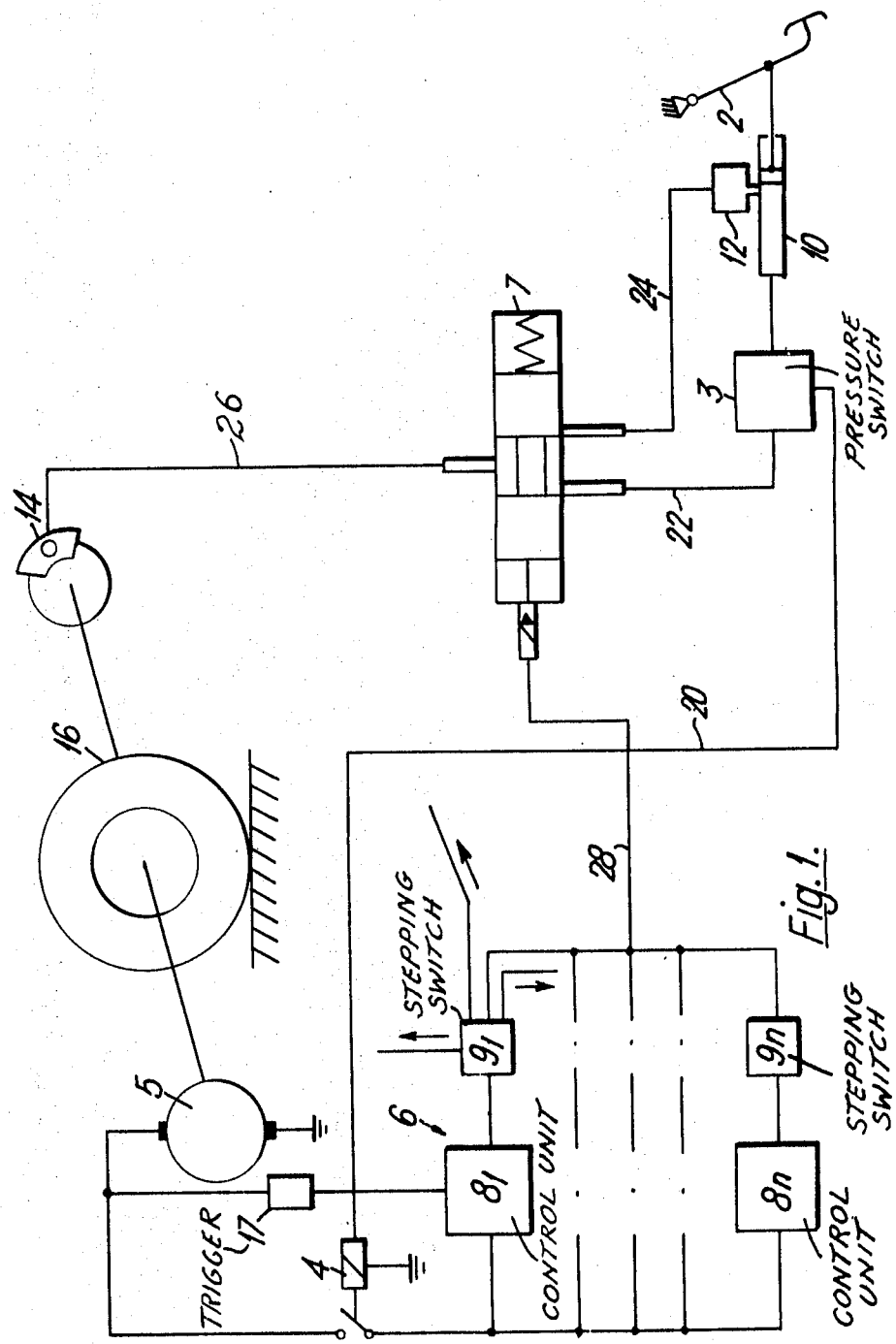
FIG. 1 is a schematic showing a block diagram of the present invention embodied in a brake system.

Referring to FIG. 1 there is shown a hydraulic brake system having a brake pedal 2, master cylinder 10 and wheel brakes 14 acting upon the wheel 16. Although only a single wheel and regulator are shown it should be understood that there may be a regulator for each wheel of a vehicle or a single regulator controlling the pressure in the entire brake system. An electromagnetically operated spool valve 7 is positioned between the master cylinder 10 and the wheel brakes 14 for controlling the pressure in the hydraulic line 26 leading to the wheel brakes 14. During normal operation of the brakes the valve is in the position shown in FIG. 1 and full brake pressure from the matser cylinder 10 is applied to the brakes via line 22, valve 7 and line 26. As will be explained hereinbelow the electromagnetically operated valve 7 may be actuated to close off the supply of fluid from the master cylinder and reduce the pressure at the wheel brakes during operation of the anti-skid system.

Pressure switch 3 in line 22 is connected to an electrical contact switch 4 via line 20 for actuating the anti-skid system when the master cylinder brake pressure exceeds a predetermined limit.

A direct current generator 5 is rotatable with the wheel 16 to provide a voltage signal which is proportional to wheel speed. A regulator 6 having a series of control units $8_1 \ldots 8_n$ and a series of corresponding stepping switches $9_1 \ldots 9_n$ is connected to receive the voltage signal from the generator 5 when the contact switch 4 is closed. The control units are connected in parallel so that each may receive the voltage signal from the direct current generator and each may actuate the electromagnetic valve 7 via line 28. The first control unit to be actuated when the brakes are applied is determined by a trigger 17 as a function of the initial speed at braking.

Figure 2:
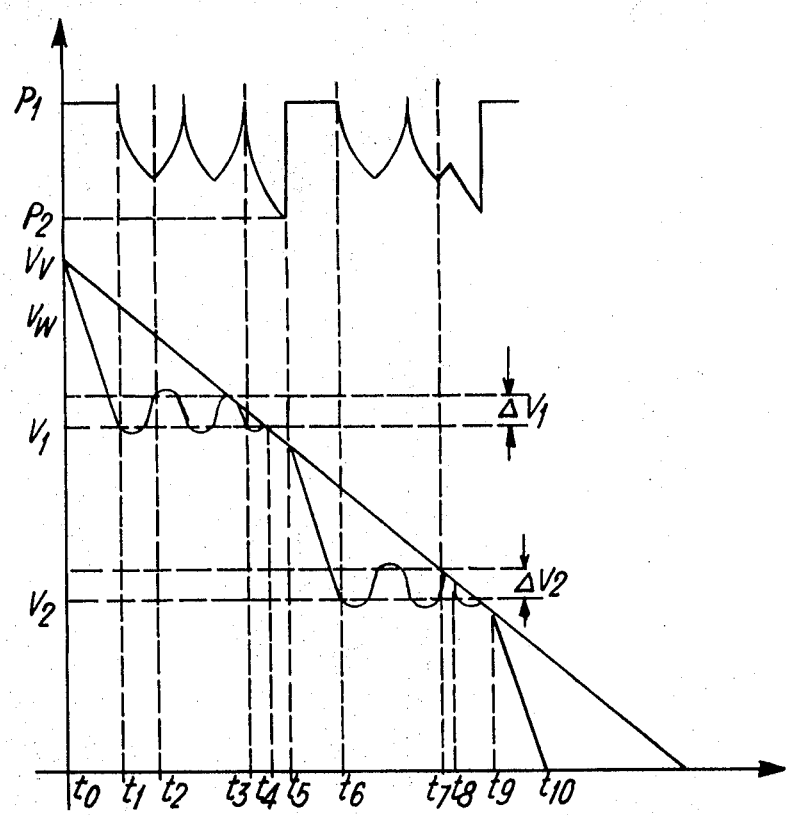
FIG. 2 shows vehicle speed, wheel speed and brake pressure as a function of time for a system embodying the present invention.

If reference is made to FIGS. 1 and 2 it will be seen that the system operates as follows. When the brake pressure exceeds a predetermined value the contact 4 is closed by the pressure switch 3 thereby activating the anti-skid system. As the brake pressure is applied to the wheel brakes the rotational speed of the wheel $v_w$ is reduced considerably below the translational speed of the vehicle $v_v$ since the brake moment is much greater than the moment transmitted from the wheel to the roadway. Without regulation the wheel would become locked when a slip value dependent on the driving conditions had been exceeded. This is shown on the curves in FIG. 2 between $t_0$ and $t_1$. In connection with FIG. 2 it should be pointed out that the curve for vehicle speed $v_v$ was presumed to be that which would result when the wheel speed followed the curve $v_w$.

At the time $t_1$ the wheel speed reaches the first speed barrier $v_1$ of the regulator 6, the output voltage of which operates a brake pressure control element such as the electromagnetic valve 7 shown in FIG. 1, for the reduction of brake pressure.

In contrast to conventional regulating devices pressure does not, however, decrease until the wheel has again reached the full revolution speed corresponding to the speed of the vehicle but only until the wheel reaches the second speed barrier $v_1 + \Delta v_1$ of the first regulating stop of the first regulating stop at the time $t_2$. The electromagnetic valve 7 is then returned to its original position thereby allowing the brake pressure to again increase. The control unit $8_1$ allows the wheel speed to oscillate about the interval $\Delta v_1$ determined by the speed barriers $v_1$ and $v_1 + \Delta v_1$ until brake pressure is once again reduced at $t_3$ and the peripheral speed of the wheel is equal to the speed of the vehicle at the time $t_4$. Now the revolution speed can no more increase by the amount of $\Delta v_1$ since in this case the wheel would have to move faster than the vehicle. At $t_5$ the stepping switch $9_1$, having a timing element therein, deactivates the control unit $8_1$ and switches the system to the second regulating step with the speed barriers $v_2$ and $v_2 + \Delta v_2$. When the wheel reaches the speed barrier $v_2$ at the time $t_6$ the regulating action described above takes place during the second regulating step. At the time $t_7$ the wheel speed happens to simultaneously reach the vehicle speed and the speed barrier $v_2 + \Delta v_2$ and brake pressure is increased. This special case has no effect on regulation and the wheel speed will correspond to the vehicle speed until the effect of the increased brake pressure is felt at $t_8$ at which time the wheel speed will again drop below vehicle speed until the regulator responds once again at $v_2$ whereupon brake pressure is again decreased. At $t_9$ the second stepping switch $9_2$ deactivates the second control $8_2$ and full brake pressure is again applied. The wheel is locked at $t_{10}$ but by this time the vehicle speed is so insignificant that a locked wheel is not dangerous and has no effect on the optimum braking.

In another embodiment of the invention stepping to the individual regulating steps or control units occurs as a function of brake pressure. The pressure and velocity curves would be identical to those in FIG. 2 and the system identical except that the stepping switches $9_1 \ldots 9_n$ would be actuated whenever the pressure dropped to $p_2$ rather than by a timing element. During the regulation at a stage about the speed interval $\Delta v$ pressure is not allowed to fall below a certain value. If the vehicle speed and the peripheral speed of the wheel are equal, such as at $t_4$, no signal is given for the increase of pressure and the pressure continues to drop to the critical value $p_2$ at $t_5$ and the pressure responsive switch switches to the speed barrier of the next regulating step or control unit.

Although the embodiment described above utilize an independent regulator for each wheel it may be desirable to interconnect the stepping switches $9_1 \ldots 9_n$ of each wheel to the controls $8_1 \ldots 8_n$ of every other wheel so that as soon as one wheel is switched to the next lower regulating level all the others will be simultaneously switched. This is particularly desirable during normal braking when wheel lockup is unlikely. The reduction in brake pressure will occur in ony one wheel so that it will hardly be noticeable by the driver.

Since it is not necessary to utilize the anti-skid system during normal braking a differentiating element may be inserted in the circuit along with a switch so that the anti-skid system would not be actuated unless the deceleration exceeded a predetermined critical rate.

In another embodiment of the invention the reaction values and the step switching of the regulator are determined on a wheel, preferably of the back axle, so that the whole system is further switched by the stepping switch of this wheel.

This regulation aims at increased security against skidding in the course of braking when driving straight ahead and cornering. The effect of different friction values between the roadway and the rolling surface of the tire or the variation in the friction value of the brake, even if occurring during braking, have, in the main, no effect on regulation.

It must be pointed out in particular that a comparison takes place for the first time between the revolution speed and the translational speed, even though indirectly. As becomes apparent from the defining equation of the slip $$s = \frac{V_T - V_R}{V_T}$$

this comparison measurement is essential for the optimum regulation.

$V_T$=translational speed of the vehicle
$V_R$=peripheral speed of the wheel

Figure 3:
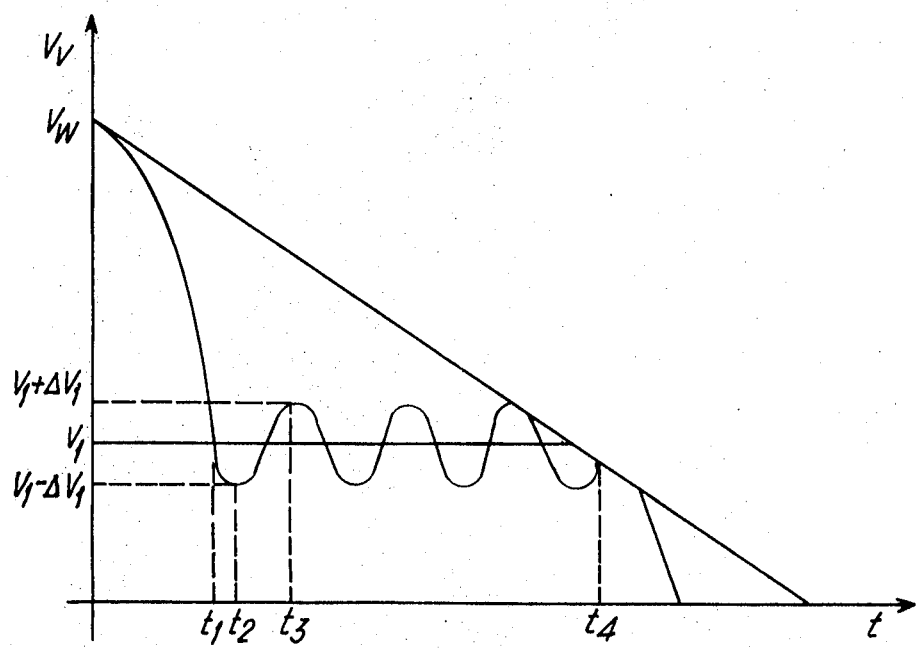
FIG. 3 shows wheel speed and vehicle speed as a function of time for an embodiment of the invention having a single speed value at each regulating step.

FIG. 3 illustrates a method of regulation in which only one reaction value is associated with each regulating step. As the wheel speed passes through $v_1$ at $t_1$ the control unit opens the electromagnetic valve to reduce pressure. However, due to the inertia in the system, the wheel will have continued to decelerate to $v_1 - \Delta v_1$ before the effect of the pressure reduction is felt at $t_2$. As the wheel accelerates through $v_1$ due to the decreased pressure the control unit closes the valve to increase pressure. Again, due to the inertia forces the wheel will have continued to accelerate to $v_1 + \Delta v_1$ before the effect of the signal to increase pressure is felt. In this way the rotational speed of the wheel will oscillate about $v_1$ until the wheel speed corresponds to that of the vehicle at $t_4$.

It will be appreciated that the invention illustrated and described herein may be modified by those skilled in the art without deviating from the spirit and scope of the invention as set forth in the following claims.

We claim as our invention:

1. In combination with a hydraulically operated brake associated with a vehicle wheel, an anti-skid system comprising a signal generator connected to the wheel for producing a voltage signal proportional to the rotational speed of the wheel, a plurality of parallel connected controls coupled to said signal generator, each of said controls being individually responsive to a different level of the voltage signal produced by the signal generator for activation thereof, the activated one of said controls generating a skid signal when the voltage signal drops below the responsive level for said activated one of said controls, means responsive to a skid signal from any one of the controls for regulating the brake pressure applied to the wheel to prevent skidding, switching means for successively deactivating each control and activating the next adjacent control responding to a lower level of said voltage signal to provide stepped speed limitations on braking of the wheel, a trigger selecting the first control to be activated as a function of the initial rotational speed of the wheel when the brake is applied, and means for regulating the output signal of each control to maintain the wheel speed between predetermined upper and lower limitations at each regulating step.

2. The anti-skid system of claim 1 wherein there are timing elements for successively deactivating the individual controls.

3. The anti-skid system of claim 1 including a switch responsive to the pressure applied to the wheel brake for successively deactivating the individual controls when the pressure drops below a predetermined level.

References Cited

UNITED STATES PATENTS

| | | | |
|---|---|---|---|
| 3,467,444 | 9/1969 | Leiber | 188—181A |
| 3,026,148 | 3/1962 | Ruof | 303—21BB |
| 3,497,269 | 2/1970 | Van Wicklin, Jr. | 303—21F |

MILTON BUCHLER, Primary Examiner

S. G. KUNIN, Assistant Examiner

U.S. Cl. X.R.

188—181R; 303—20; 307—120; 317—5; 324—161; 340—263